United States Patent [19]
Nelson et al.

[11] Patent Number: 6,018,232
[45] Date of Patent: Jan. 25, 2000

[54] METHOD OF OPERATING BATTERY POWERED COMPUTING DEVICE WITH RADIO TRANSMITTER

[75] Inventors: Phillip D. Nelson; Robert B. Jaeger, both of Aptos, Calif.

[73] Assignee: Fujitsu Limited, Kawasaki, Japan

[21] Appl. No.: 09/203,041

[22] Filed: Nov. 30, 1998

Related U.S. Application Data

[62] Division of application No. 08/607,506, Feb. 27, 1996, abandoned.

[51] Int. Cl.[7] .......................... H01M 10/44; H01M 10/46
[52] U.S. Cl. ............................................. 320/127; 320/135
[58] Field of Search ...................... 320/127, 129, 320/131, 132, 135, 152, 162, 163

[56] References Cited

U.S. PATENT DOCUMENTS

| | | | |
|---|---|---|---|
| 4,272,806 | 6/1981 | Metzger . | |
| 4,656,318 | 4/1987 | Noyes ........................................ | 379/93 |
| 5,041,964 | 8/1991 | Cole et al. ............................... | 395/750 |
| 5,043,721 | 8/1991 | May ................... | 340/825.44 |
| 5,167,024 | 11/1992 | Smith et al. ............................ | 395/375 |
| 5,337,044 | 8/1994 | Folger et al. ....................... | 340/825.44 |
| 5,444,869 | 8/1995 | Stricklin et al. ........................... | 455/89 |
| 5,446,904 | 8/1995 | Belt et al. ................................ | 395/750 |
| 5,471,624 | 11/1995 | Enoki et al. ............................ | 395/750 |
| 5,510,778 | 4/1996 | Krieter et al. ..................... | 340/825.44 |
| 5,530,879 | 6/1996 | Crump et al. ............................ | 395/750 |
| 5,596,628 | 1/1997 | Klein ........................................ | 379/93 |
| 5,627,882 | 5/1997 | Chien et al. ............................... | 379/61 |
| 5,633,573 | 5/1997 | Van Phuoc et al. ..................... | 320/152 |
| 5,640,081 | 6/1997 | Austin et al. ............................ | 320/127 |
| 5,804,894 | 9/1998 | Leeson et al. ....................... | 320/135 X |
| 5,818,201 | 10/1998 | Stockstad et al. ....................... | 320/119 |

OTHER PUBLICATIONS

*Intel Pentium™ Processor User's Manual, Volume 1: Pentium™ Processor Data Book,* Chapter 14, pp. 14–1 and 14–2, 1993, no month.

*Primary Examiner*—Edward H. Tso
*Attorney, Agent, or Firm*—Skjerven, Morrill, MacPherson, Franklin & Friel; Paul E. Lewkowicz; Norman R. Klivans

[57] ABSTRACT

A portable computing device (e.g. a notebook type computer) also includes communications features including a pager receiver and a radio frequency modem which are supported by allowing the device, under application program control, to resume operation from a suspend (sleep) state upon receipt of a paging message. Additionally, depending upon the contents of the paging message, various application programs can be automatically launched in the main processor. Under application program control, the device can operate in a background state with for instance the main screen, its backlight and the keyboard powered down, but with the main processor running at full speed for unattended operation. Under application program control in normal or background mode, the device can request that the unit suspend operation without user intervention, for battery power savings during unattended operations. Under application program control, the device can set the state of a status message indicating a message pending or a urgent message waiting. Thus reception of messages during unattended and/or background state operation is communicated to the user without resuming full operation. Additionally, in response to a drop in output voltage from the battery which is the system power supply, transmission power of the RF modem is reduced, thereby allowing RF modem transmissions over the entire battery discharge curve.

4 Claims, 6 Drawing Sheets

Port Address FD61H/INDEX : 32H Read/Write [Initial : FFH]

| 7 | 6 | 5 | 4 | 3 | 2 | 1 | 0 |
|---|---|---|---|---|---|---|---|
| RRQ2 | RRQ1 | RRQ0 | - | BG OP | S DISK | HS1 | HS0 |

FIG. 2A

Port Address FD61H/INDEX : 33H Read/Write [Initial : 00H]

| 7 | 6 | 5 | 4 | 3 | 2 | 1 | 0 |
|---|---|---|---|---|---|---|---|
| - | - | BG ICON | URG BL | URG ON | BOX B | BOX OUT | BOX IN |

FIG. 2B

Port Address FD61H/INDEX : 34H Read/Write [Initial : FEH]

| 7 | 6 | 5 | 4 | 3 | 2 | 1 | 0 |
|---|---|---|---|---|---|---|---|
| - | - | - | - | - | - | - | RADIOAK |

FIG. 2C

Port Address FD61H/INDEX : 2DH Read/Write [Initial : FFH]

| 7 | 6 | 5 | 4 | 3 | 2 | 1 | 0 |
|---|---|---|---|---|---|---|---|
| - | - | - | - | ACPWR# | LLB# | LB# | - |

FIG. 2D

| Initial System State | Event | Resulting System State |
|---|---|---|
| On | Suspend/Resume button pressed | Background |
| | Auto suspend | Background |
| | Suspend Request (PPMI) | Suspend, Ring Wait, or Save-to-Disk |
| Background | Suspend/Resume button pressed | On |
| | Suspend Request (PPMI) | Suspend, Ring Wait, or Save-to-Disk |
| | Background Operation disabled (PPMI) | Suspend, Ring Wait, or Save-to-Disk |
| Suspend (Resume on Pager SMI enabled) | Suspend/Resume button pressed | On |
| | Resume Time | On |
| | Pager SMI | Background |
| Suspend (Resume on Pager SMI disabled) | Suspend/Resume button pressed | On |
| | Resume Time | On |
| | Pager SMI | Suspend (pager SMI rejected) |
| Ring Wait (Resume on Pager SMI enabled) | Suspend/Resume button pressed | On |
| | Resume Time | On |
| | Modem Ring | On |
| | Pager SMI | Background |
| Ring Wait (Resume on Pager SMI disabled) | Suspend/Resume button pressed | On |
| | Resume Time | On |
| | Modem Ring | On |
| | Pager SMI | Suspend (pager SMI rejected) |

FIG. 3

'external subroutine for setting URGENT (!!!) display:

Const URGENT_OFF = 0
Const URGENT_ON = 1 Const URGENT_BLINK = 2

Declare Sub SIC_Urgent Lib "c:\stat_lcd\iconctrl.dll"
(ByVal wStatus As Integer)

'external subroutine for setting in/out box display:

| | |
|---|---|
| Const DIRECTION_OFF = 0 | 'OFF |
| Const DIRECTION_IN = 1 | 'IN ARROW ONLY |
| Const DIRECTION_OUT = 2 | 'OUT ARROW ONLY |
| Const DIRECTION_BOX = 4 | 'BOX ONLY |
| Const DIRECTION_IN_BOX = 5 | 'IN + BOX |
| Const DIRECTION_OUT_BOX = 6 | 'OUT +BOX |
| Const DIRECTION_IN_OUT_BOX = 7 | 'IN + OUT + BOX |

Declare Sub SIC_Direction Lib "c:\stat_lcd\iconctrl.ddl"
(ByVal wStatus As Integer)

'functions for MUXing serial port:

Declare Function GetMuxStat Lib "c:\stat_lcd\iconctrl.dll"
        ( ) As Integer
Declare Sub SetMuxIR Lib "c:\stat_lcd\iconctrl.dll" ( )
Declare Sub SetMux9Pin Lib "c:\stat_lcd\iconctrl.dll" ( )

FIG. 4A

```
Sub Form_Load ( )
If  GetMuxStat ( ) = 1 Then          'if UART MUX is now InfraRed
    MuxButton(1) .value = True       'set IR button to true
Else MuxButton(0) .value = True      'set 9-Pin button to true
End If InBox(0) .value = True
SIC_Direction (DIRECTION_OFF)        'initialize in/out box to off UrgStatus(0) .value = True
SIC_Urgent (URGENT_OFF)              'initialize ! ! ! display off
End Sub Sub InBox_Click (Index As Integer)
If Index = 0  Then SIC_Direction (DIRECTION_OFF)         'status icon off
If Index = 1  Then SIC_Direction (DIRECTION_IN)          'in arrow on
If Index = 2  Then SIC_Direction (DIRECTION_OUT)         'out arrow on
If Index = 3  Then SIC_Direction (DIRECTION_BOX)         'box on
If Index = 4  Then SIC_Direction (DIRECTION_IN_BOX)      'in + box on
If Index = 5  Then SIC_Direction (DIRECTION_OUT_BOX)     'out + box on
If Index = 6  Then SIC_Direction (DIRECTION_IN_OUT_BOX)  'in + out + box End Sub Sub MuxButton_Click  (Index As Integer)
If Index = 0  Then
    SetMux9Pin            'Set the UART to 9-Pin External
End If
If Index = 1  Then
    SetMuxIR              'Set the UART to InfraRed
End If
End Sub
Sub UrgStatus_Click  (Index As Integer)
```

FIG. 4B

```
If Index = 2  Then SIC_Urgent  (URGENT_BLINK)     'blink urgent icon
If Index = 0  Then SIC_Urgent  (URGENT_OFF)       'urgent icon off
If Index = 1  Then SIC_Urgent  (URGENT_ON)        'urgent icon on
End Sub
```

FIG. 4C

METHOD OF OPERATING BATTERY POWERED COMPUTING DEVICE WITH RADIO TRANSMITTER

This application is a division of application Ser. No. 08/607,506, filed Feb. 27, 1996 now abandoned.

BACKGROUND OF THE INVENTION

1. Field of the Invention

This invention relates to computers and especially to a portable battery powered computer which includes communication features such as a wireless modem and paging receiver.

2. Description of the Prior Art

Portable computers are well known, as are personal "communicators" of the type exemplified by the Motorola Envoy. Such portable computing devices are invariably battery powered. Since presently available batteries have very limited storage capabilities, it is important that such portable computing devices (both computers and communicators) limit their power draw. Therefore there is known a wide range of techniques for conserving power in such battery powered devices. These power conservation methods include shutting down portions (various subsystems) of the computer when not in use, as well as putting the computer CPU (the main processor) to "sleep" when its capabilities are not being used.

Many portable computers have a main microprocessor of the type commercially available from Intel and other suppliers called generically the "486" type. This microprocessor (and some others such as the Intel Pentium™ processors) includes a suspend/resume feature and system management mode, for power management. A special signal generated for instance by a set of key strokes or pushing a special button on the computer or in some cases closing the top of the computer and thereby actuating a switch, is sent to the microprocessor. This command is called the system management interrupt (SMI) and is documented in the Intel document *Pentium Processor User's Manual* Vol. 1, 1993, pp. 14-1 to 14-2. The microprocessor, upon receiving the SMI when the microprocessor is operating, executes SMI code in its SM (system management) mode, saves its current register state of operation to SRAM memory, and then enters a suspend (sleep) state in which it is not quite off but draws very little power, and hence is for all practical purposes not operating except for checking for a subsequent SMI.

In response to subsequent receipt of an SMI, the microprocessor resumes operation (executes its RSM instruction) with the same state that was previously saved and does so very quickly. Hence the system management interrupt allows "toggling" between the suspend and resume states, allowing power conservation without significantly impeding use of the computer, i.e. there is no need to reboot and reload application programs.

In some computers the system management interrupt is also generated by a timer; when for instance there has been no keyboard input for a particular amount of time, the SMI is generated, putting the computer into the suspend state until additional keyboard activity occurs.

Another feature available in some portable computers is the so called "instant on" feature. This is somewhat different from the suspend state, in that the computer is maintained in a low power standby state with some of the computer subsystems, e.g. the screen, powered down. Any of the usual processor interrupts then bring the entire computer back to full operation. This standby state typically draws more power than does the suspend state.

Thus there is a continuum of exemplary computer states involving increasing amounts of power consumption. The first state is when the computer is actually off and drawing no power (except perhaps for time purposes or to maintain certain data in memory); the next state is the suspend state supported by the SMI; the next state is the standby state which corresponds to the instant on feature; and the last state is the full on state in which all computer subsystems are fully operational.

However neither the instant on feature nor the manually generated SMI resulting in the suspend state are suitable for a portable computer which also includes communication features. Such communication features, while generally not part of portable computers, have been available in communicators. These communicators typically have included only modest computing capabilities but also include for instance a conventional wired modem for connection to telephone lines, a wireless modem for either facsimile, packet data, and/or telephone communications, and a pager receiver (an integrated pager).

Since a purpose of such communicators is to be able to receive messages from an external source at all times, typically via the pager or the wireless modem, the communicator must be at least partly powered up at all times. Thus it is maintained in a low power state (not off) even when the user is not actively using it, in order to receive messages by paging or radio modem transmission. This (relatively) low power state in fact requires a relatively high power drain because significant portions of the communicator must be on at all times in order to be able to receive the messages. Hence these communicators suffer from needing frequent battery changes and/or recharges.

SUMMARY

In accordance with the present invention, several improvements have been made in a combination portable computer/communicator computing device which in one embodiment is a portable computer with an integrated paging receiver and RF and/or wired modem. These improvements increase battery life by reducing current drain, while enabling use of the communications feature at all times. The paging receiver is operatively connected to or integrated into the computing device itself so that a conventional paging message can activate the computing device, for instance to allow the radio modem to be turned on in response to the paging message and to receive information which is then stored in the computing device. Thus the computing device operates at all times as a full fledged communicator, without excessive battery drain.

In one embodiment the computing device is maintained in a suspend state and upon receipt of the paging message, a system management interrupt (SMI) is generated by the pager interface and directed to the main microprocessor (CPU) to resume operation of the CPU. This can also result in turning on for instance of the radio modem to receive a message. That is to say, depending upon the contents of the paging message, various applications programs to be executed by the CPU can be launched automatically. Thus power management state of the computer is controlled remotely by messages transmitted to the pager.

In another feature, under application program control the computing device can set the state of a secondary status display (typically a small auxiliary LCD) to provide an "urgent message waiting" indicator. This takes place even though the computing device is operating in a background state with the main display powered down. Thus the reception of messages for instance via the pager or radio modem during unattended and/or background state operation can be visually indicated to the user, without resuming full operation.

Thus, one operating mode of the computing device is the background state, which means that the CPU operates at full clock speed for unattended operation. In order to reduce power draw, various peripherals such as the main display and keyboard are turned off (powered down) in the background state. With the computing device thus operating in background state, upon receipt of for instance a paging message by the paging receiver, the computing device can automatically turn on its other peripherals, for instance the radio modem to receive data, without user intervention.

In summary, this approach allows:

(1) The entire computing device to be suspended into a very low power consumption mode, except for the integrated paging receiver, which remains powered sufficiently to receive paging messages.

(2) Upon receipt of a message sent via a conventional wireless paging service, the computing device can be (optionally) resumed by the integrated paging receiver to full power-on operational state, that is it does not require rebooting the operating system nor reloading application programs.

(3) Application programs can be launched to perform various tasks, such as powering on the RF modem and invoking data transfer sessions, (optionally) depending on the contents of the paging message received while the computing device was suspended.

(4) Additionally, there is a "background" power-on state, which operates with certain peripheral subsystems, for example the display, pen and keyboard, powered off, so:

(a) the computing device can resume and operate unattended and the application program thus invoked can re-suspend the computing device when it has completed execution;

(b) the unattended operation of the computing device will not be interrupted by unintentional user intervention be e.g. the pen or keyboard;

(c) power consumption is minimized during unattended operation, because several of the subsystems are powered down.

(5) Further, a separate LCD status display is powered up even while the computing device is suspended for notifying the user both of the current power management state of the computing device, including "background" mode, and of conditions determined by an application program, such as an urgent message has been received.

In another feature, a power control circuit is provided for the transmitter portion of the radio (wireless) modem in order to maintain, over the entire discharge curve of the battery, a minimum required level of input voltage to the radio transmitter power amplifier. This power control circuit measures the battery voltage prior to the start of transmission and predicts what the input voltage to the power amplifier will be when transmission starts. This prediction is based on a known relationship between power amplifier input voltage, input current and output power level. The output power level is then set so that the input voltage will never be less than the required minimum level. This allows successful radio modem transmissions throughout the discharge curve of the battery, to compensate for the battery voltage drop as is typical of batteries during their discharge cycles. This feature is implemented in one embodiment with no added circuitry since the packet radio protocol requires that the output power be adjustable in discrete steps anyway to limit the range of received signal strength at the base station receiver. This is an improvement over the prior art of adjusting the output power only after the minimum voltage limit has already been reached. The present approach prolongs battery usefulness for both rechargeable and non-rechargeable batteries.

It is to be understood that the present improvements are applicable to a range of portable computing devices, including those with only limited computing capabilities.

BRIEF DESCRIPTION OF THE DRAWINGS

FIGS. 2A, 2B, 2C, and 2D show power control status registers in accordance with one embodiment of the present invention.

FIG. 3 shows system operating states in accordance with the present invention.

FIGS. 4A, 4B and 4C show a computer program for control of a status display in accordance with the present invention.

DETAILED DESCRIPTION

Figure 1:
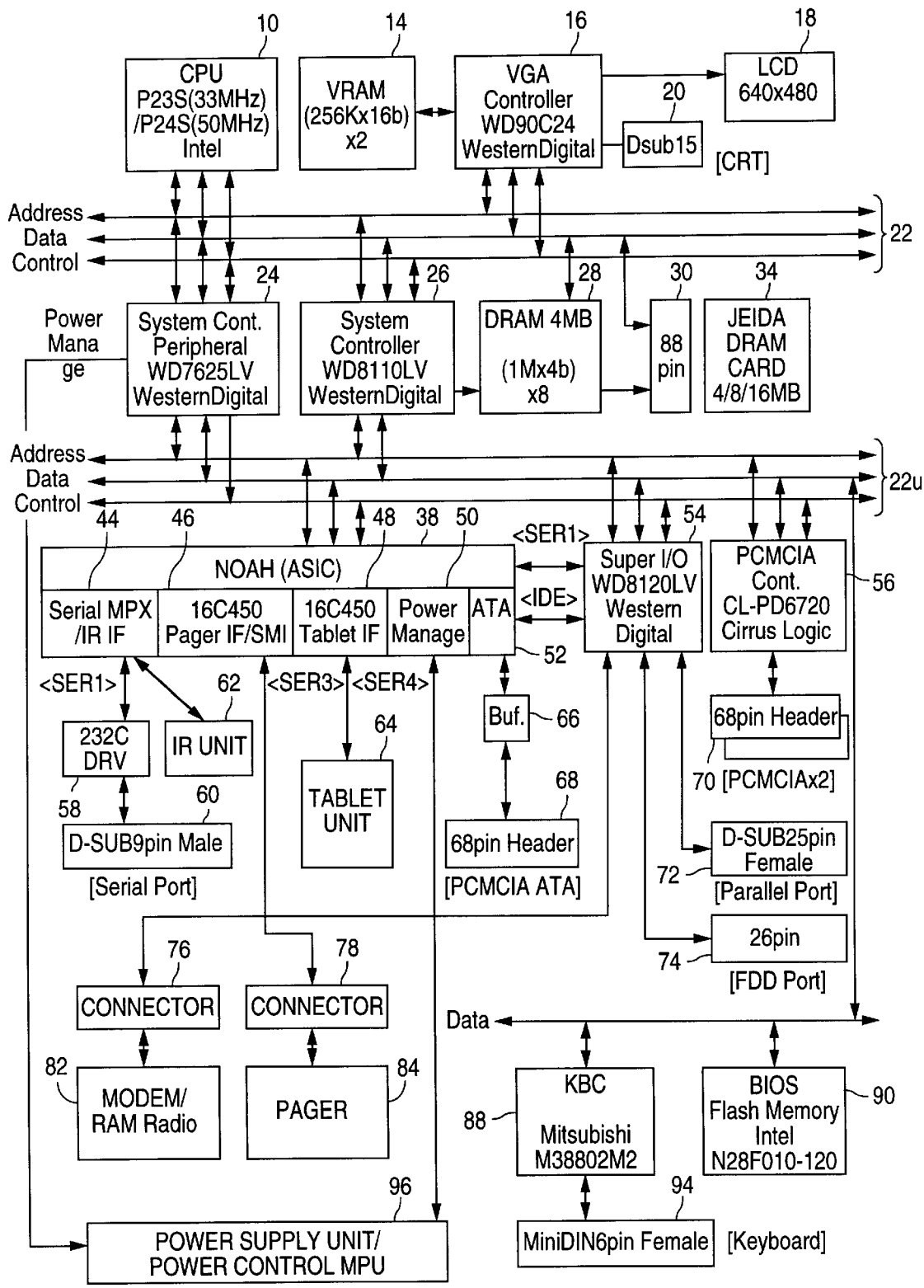
FIG. 1 shows a block diagram of an exemplary portable computing device in accordance with the present invention.

FIG. 1 shows the block diagram of a computing device in accordance with the present invention which includes the features and elements of a conventional "notebook" portable computer combined with communications capabilities including a pager receiver and a radio modem. This diagram is exemplary (and not limiting) of a system in which the present improvements may be incorporated. This particular embodiment is a full functioned Intel 486-type/DX2-50 notebook computer including a Mobitex radio frequency modem and a POCSAG-paging receiver. With reference to FIG. 1, the CPU 10 (main microprocessor) is an Intel-type 486 processor, e.g. the P23S or the P24S. CPU 10 is connected to a conventional address, data and control bus 22 to which is also connected a video memory (VRAM) 14 via conventional VGA controller 16, e.g. a Western Digital WD90C24. Connected to VGA controller 16 is the LCD which is the main computer display having the pixel dimensions as shown, and the secondary display 20 connected by a Dsub15 connector. There is also provision (not shown) for connection of a CRT.

Also connected to the bus 22 is a conventional system peripheral controller 24 e.g. the Western Digital WD7625LV, a system controller 26 e.g. the Western Digital WD8110LV, 4 megabytes of dynamic RAM 28, and (connected via 88 pin connector 30) a JEIDA DRAM memory card 34 including additional random access memory.

Connected to the portion 22A of bus 22 is an interface and power management integrated circuit 38 which in this case is an ASIC (applications specific integrated circuit, i.e. a gate array) which includes various functions. The first function of ASIC 38 is a multiplexed serial port/IR interface 44 which connects via a 232C driver circuit 58 to a 9 pin connector 60 for connection to a serial port device. Port 44 also connects to an infrared unit 62 which provides infrared serial communications. Thus there are two 16C550 UARTS in the Western Digital WD88120LV chip 54; UART 44 is multiplexed by ASIC 38 between 9 pin connector 60 and an IR unit 62. The other UART is connected to (RF) modem 82.

The next element is the pager interface 46 which is an 16C450 interface connectable via connector 78 to a pager 84. Also provided is the 16C450 tablet interface 48 which is connected to a tablet unit 64. This is for a conventional pen-based input. The tablet unit 64 is located physically under the screen 18.

A power management function portion 50 is described in greater detail below. ATA portion 52 connects via a buffer 66 to a connector 68 for PCMCIA ATA, which is a hard disk drive interface similar to the IDE interface (Integrated Drive Electronics).

Also connected to the ASIC 38 is a super I/O chip 54 e.g. the WD8120LV, which also connects to the bus 22A. The next element is a PCMCIA controller 56 which is e.g. the Cirrus Logic CL-PD6720 connecting also to bus 22A and connecting to PCMCIA cards (e.g. two such cards) via a connector 70. Also shown are connectors 72 and 74 connecting to respectively a parallel port and floppy disk drive port of the super I/O 54 chip. In the lower left hand portion of FIG. 1, connector 76 connects the super I/O chip 54 to the radio (and also wired) modem 82. RF modem 82 may be for instance a cellular telephone modem or other type of well known radio-based modem such as MOBITEX, ARDIS or CDPD, etc. Power supply unit and power supply microcontroller unit 96 include the actual power supply and the associated microcontroller which are connected (for control purposes) to the power management portion 50 of the ASIC 38 and to system peripheral controller 24.

In the lower right hand portion of FIG. 1 is a Data bus to which is connected the keyboard controller 88 which is connected to a keyboard 94 via a connector 94 and also a BIOS (basic input output system) flash memory 90 for system memory purposes.

While in this case the RF modem 82 is a Mobitex type modem, this is not limiting but is illustrative. Similarly in this case the pager 84 is a POCSAG type paging receiver which provides alphanumeric information of a type more extensive than a mere telephone number. This is well known and of a commercially available type and again is not limiting but is illustrative. It is to be understood that each of the various elements shown in FIG. 1 is of commercially available type except as described hereinafter. Moreover, the features described hereinafter are applicable to other computing devices; the device of FIG. 1 is illustrative of one application.

As a matter of technical background, APM (Advanced Power Management) is a general set of interfaces defined by Microsoft and Intel (see ADVANCED POWER MANAGEMENT BIOS Interface Specification Rev. 1.1, SEP-93, Intel Part Number 241704-001). These interfaces include a BIOS interface, which has been implemented with extensions by Phoenix Technologies in their BIOS (Basic Input/Output System) product as the Phoenix Power Management Interface (PPMI). Additionally, Microsoft provides with its MS-DOS Operating System a power management device driver, POWER.EXE, which (optionally) uses the BIOS services to allow MS-DOS and the end user limited control of system's power management mode; the modes being Off, Standard & Advanced.

Standard PM (Power Management) mode does not rely on BIOS services and has very limited functionality (i.e. MS-DOS can put the processor into a lower power mode, if the operating system and application software are "idling").

APM utilizes more complete cooperation between the operating system, application programs and the BIOS APM (PPMI) interface, for example, sending "warning" messages to application programs before allowing the system to suspend (e.g. after a period of inactivity). Microsoft has extended this concept to their Windows Operating System message servicing architecture by providing Windows APM drivers (POWER.DRV and VPOWERD.386).

In accordance with the present invention, the Phoenix PPMI is extended, adding services to enable/disable Background Mode and the ability for an application program to request that the system suspend (Suspend is usually requested by the BIOS). To allow applications to access these extensions in the MS-Window environment, a Windows driver is provided.

A feature of APM is that, except in the case of a low-low battery "crisis" suspend, device drivers and application programs are notified of a suspend request and may reject if they are busy. If some applications accept the suspend request and others reject it, this may lead to synchronization problems since the system has not suspended, but some drivers or applications may think they were suspended, since they did not reject the suspend request.

In a first feature in accordance with the present invention, operation of this computing device is allowed to resume from a suspend state upon receipt of a paging message. That is, under program control, the computing device resumes operation of the main processor 10 from a suspend state upon receipt of a paging message which has been transmitted to pager 84. This program is the resume code in the BIOS, which is executed in SMM after receipt by main processor 10 of the SMI. Additionally, depending upon the contents of the paging message, additional application programs can be automatically launched by main processor 10 without user intervention.

This feature is supported in the BIOS (e.g. the commercially available Phoenix Technologies BIOS referred to above) stored in memory 90 as follows. A parameter is provided in the BIOS which either enables or disables the "resume on pager" feature. When this feature is enabled, the processor 10 resumes operation from the suspend state if a paging message is received. This suspend state is as described above, wherein the main processor 10 effectively suspends execution but saves its previous state thereby minimizing power consumption but allowing quick resumption of full operation. This is a well known feature of the 486 type of microprocessors and is not described further herein. Thus with reference to FIG. 1, a paging message is conventionally transmitted from an external source to the pager 84. This paging message is then sent via the pager interface 46 to the ASIC 44, and then the ASIC 44 generates an SMI which is sent to the main processor 10 which in response puts the computing device into the background state, whereby the main processor 10 operates at its full clock speed but the other peripherals (such as the display 18 and keyboard 88) are not powered up.

Note that in the background state, the auto suspend feature of main processor 10 is not operative. Therefore an application program running on main processor 10 in the background state must suspend operation of the main processor 10 using a suspend request as described below to avoid the synchronization problems alluded to above.

It is therefore possible for the PCMCIA cards (attached for instance to connector 70) to be off while the main processor 10 remains operating. This is because APM-aware application programs can accept or reject the suspend request notification, but other application programs, such as the PCMCIA card manager, may not be aware of such rejection. Once the main processor 10 is in its background state, i.e. operating at normal clock speed, any desired application program can be automatically launched in response to a particular paging message.

Thus the paging message may resume execution of an application program(s) by the main processor upon the receipt of the paging message. The resumed application program(s) are those which were active at the time of the previously executed suspend request. The contents of the paging message may be scanned (by one of the reactivated application programs after operation of the main processor has been resumed) and depending on the message contents, another application program(s) launched without user intervention. For instance a particular paging message may indicate to turn on the RF modem 82 for receipt of a longer message which is automatically downloaded into the computing device from a remote source via the RF modem 82. This occurs without user intervention, and generally without the user even being aware of this happening. For instance, the computing device could be in the user's briefcase or otherwise left unattended while these operations are occurring.

Thus the System Management Interrupt causes the main processor to return to "full" (normal operation) processing speed and execute special system management resume code in the BIOS, which in turn restores the state of the computing device to what it was at the instant before the suspend request SMI was generated. Control is then returned to the operating system, e.g. a combination of MS-DOS and Windows. Windows' COMM driver will service a pending regular (not system management) interrupt from the paging receiver and retrieve the received paging message, which is then passed onto a paging application program. This paging application program can invoke another application program depending on the contents of the paging message.

Upon completion and receipt of the message, for instance via the RF modem 82, i.e. completion of execution of the application program, the main processor 10 returns to the suspend state upon receipt of a suspend request from the application program. When the suspend request is issued, the BIOS immediately initiates the suspend procedure. This request is valid when the computing device is in the on state or in the background state, as described below. Even if background state operation is enabled, the computing device goes into the suspend procedure.

Note however that the computing device does not necessarily actually suspend operation if an APM (software) driver is connected. Rather, a suspend request notification message is sent to all APM-aware drivers (software modules) and to application programs which may reject the suspend request if they are busy and do not want to suspend operation. Thus, after completion of the desired task, the computing device, under control of the application program, returns to the suspend state, i.e. is asleep, awaiting the next need to resume operation. The actual return to the suspend state is performed by the BIOS and the suspend feature of the main processor.

Thus the availability of the background state operation supports the resume-on pager feature. Again, this feature is enabled or disabled depending on a BIOS parameter. The computing device is intended to send and receive various data without user intervention as described above. Thus it is possible that the user may not even notice that the communication module (pager 84/RF modem 82) is in operation, and may try to suspend system operation during communications. However the BIOS does not allow the main processor 10 to enter the suspend state until a particular communication is completed and the communication module is idle. Background state is the same as the fully on state, with the exceptions that:

1. The main display 18 and its associated back light (not shown) are turned off, both to conserve power and to make the computing device appear to the user as if its operation is suspended.

2. The auto-suspend feature is disabled because some application programs may require more time than the auto-suspend timer allows. (The auto suspend timer normally puts the computing device into the suspend state if a particular time, as measured by the timer, elapses without any activity).

3. The tablet 64 (and its associated pen) and the keyboard 68 input are ignored to prevent accidental user input.

Certain operations are prohibited in the background state. An application program must not disable power management while the computing device is in the background state. If power management is disabled while the computing device is in the background state, the computing device cannot be returned to the on state by pressing the suspend/resume button or by executing keystrokes. An application program running in the background state must not issue a suspend request through the APM driver. Instead the application program must use the BIOS PPMI suspend request, as described below. An application program running in the background state must not change the auto suspend timer through the PPMI or SETUP modules. An application program running in the background state must not change the display timeout through PPMI or SETUP. Once the background state operation has been enabled, it stays enabled until explicitly disabled or until a PPMI suspend request is issued.

Thus in the background state the computing device can, under application program control, operate with the display 18, its associated backlight, and the keyboard 88 off, but with the main processor 10 running at full clock speed for unattended operation.

Another feature in accordance with the present invention supports the background state and unattended operation of the computing device. That is, the computing device can, under application program control, set the state of the status LCD 20 (a small LCD independent of the main screen 18) to provide a message in/out icon and an urgent message waiting indicator. Thus the reception of messages during unattended and/or background state operation is communicated to the user without resuming operation of the computing device. This is because the status LCD 20 is in operation even when the main processor 10 is in the suspend state. That is to say, this information displayed by the LCD 20 is provided from the power management microcontroller 96 and ASIC 44 rather than from the main processor 10.

FIGS. 2A, 2B, 2C and 2D show various located registers in ASIC 44 to support the above described power control features. FIG. 2A shows a host command/status register where the bits have the following significance:

Bit 7-5: RRQ2-0 (Radio Request)

Request code for power source of RF modem (radio module).

```
RRQ 2-0 Request
[0,0,0]: Reset cf acknowledge
[1,1,0] - [1,1,1]: Reserved
[0,0,1]: Reserved
[0,1,0]: Power source for COM. Module ON
[0,1,1]: Reserved
[1,0,0]: Reserved
[1,0,1]: Power source for COM. Module OFF
```

Bit 3: BG_OP (Back Ground Operation)
 This bit informs of the background state to Power MPU 96. Whenever the computing device enters into the background state, this bit is set.

| 0: Background Mode Disabled | 1: Background Mode Enabled |
|---|---|

Bit 2: S_DISK (Save to Disk Mode)
 This bit informs of the setting of system set-up menu to Power MPU 96. Change of the system setting is reflected in this bit.

| 0: Save to Disk | 1: Memory Suspend |
|---|---|

Bit 1-0: HSI-0 (Host Status)
 These bits inform of the system state, e.g."ON", "Background", "Waiting" or "Suspend". Every change of the state is reflected in this bit.

```
[HS1, O] = [0,0] Suspend
           [0,1]: RI Waiting
           [1,0]: Background operation
           [1,1]: ON
```

The icon display register controls the urgent message feature and as shown in FIG. 2B has bits having the following significance:
Bit 5: BG ICON (Background Operation Icon)
 This bit turns on or off the icon on status display

```
     20 indicating "Background operation".
        0: ICON OFF        1: ICON ON (Display)
```

Bit 4-5 : URG_XX (Urgent Icon)
 This bit controls the icon of "URGENT".

```
        Bit 4: URG_BL (Urgent Icon blink)
        0: No blink     1: Blink
        Bit 3: URG_ON (Urgent Icon ON/OFF)
        0: ICON OFF   1: ICON ON
```

Bit 2-0: BOX_XX (IN/OUT BOX Icon)
 This bit controls the icon of "IN/OUT BOX".

```
Bit 2: BOX_B ("BOX" Icon of IN/OUT BOX ON/OFF)
0: ICON OFF           1: ICON ON (Display)
Bit 1: BOX_OUT ("OUT" Icon of IN/OUT BOX ON/OFF)
0: ICON OFF           1: ICON ON (Display)
Bit 0: BOX_IN ("IN" Icon of IN/OUT BOX ON/OFF)
0: ICON OFF           1: ICON ON (Display)
```

The power MPU acknowledge register of FIG. 2C controls the power source switching for the radio modem 82 and has the single bit as follows:

Bit 0: RADIOAK (Radio Acknowledge)
 When the power source switching requested by "Radio RQ" is completed, this bit becomes "1". Nack (negative acknowledge) is informed by more than 500 ms of no response against "Radio RQ".

| 0: none (or Nack) | 1: Power source switching completed. |
|---|---|

The power MPU status register of FIG. 2D has the meaning as follows:
Bit 3: ACPWR (AC Power Source)
 This bit shows the status of external power source input.

| 0: External power source inputting |
|---|
| 1: No external power source input |

Bit 2: LLB# (Low Low Battery)
 This bit shows the status of the main battery of the computing device.

| 0: Low low battery (need to stop operation) |
|---|
| 1: none |

Bit 1: LB# (Low Battery)
 This bit also shows the status of main battery.

| 0: Low battery (need to pay attention) |
|---|
| 1: none |

FIG. 3 shows (in a tabular form) a state diagram indicating state transitions where the background state operation is enabled. The "Suspend/Resume button" is a user-controlled button on the computing device allowing the user to toggle between these two states. "Ring Wait" is the state of awaiting a Modem Ring. This state diagram makes clear the transitions between the states of (1) being on (fully powered up) state, (2) the background operation state, (3) the suspend state, and (4) the ring wait state. The state transitions are determined by the BIOS. While the corresponding BIOS code is not shown here, it is readily written by one of ordinary skill in the art in light of this disclosure.

As described above, one feature which supports the background and suspend states is the provision of the message in/out and the urgent message waiting via the status display 20. The corresponding urgent status icon can have any one of three values, i.e. off, on, or blink. The in/out message box status icon can have any one of the values off, in arrow only on, out arrow only on, message box only on, in arrow in box on, out arrow in box on, and in and out and in box on. Thus the status display 20 shows these icons even when the computing device itself is in the suspended state.

Hence, an application program running in the background state can warn the user of an urgent message by using the status display in response for instance to a received paging message which wakes the computer from the suspended state and puts it in the background state. The urgent message icon can flash on and off to better attract attention of the user. This indicates a received paging message for instance or initial receipt of a paging message followed by, after the RF modem is turned on, a longer message received via the RF modem. Thus an application program running in the background state may turn on the urgent message icon to indicate receipt of an urgent message and then again suspend operation of the computing device while the urgent message icon continues to be displayed and/or to flash. That is to say, this status display 20 continues to provide an indicator even in the suspend state of the computing device. This status display 20 is e.g. a reflective (not backlit) LCD to minimize power drain so that it at least a portion of it is powered on at all times while drawing minimum power.

FIGS. 4A, 4B and 4C show a exemplary (application) computer program for controlling the urgent message indicator icon. FIG. 4A shows this program's general declarations and FIGS. 4B and 4C show the actual program. The software module ICON CTRL.DLL receives passed parameters as Word values. Because the language in which this program is written, Visual Basic, passes parameters by reference, the "ByVal" keyword is required in the declaration in FIG. 4B to pass the correct parameters. Similarly, the value "As Integer" ensures that the value passed is a 16 bit (Word) value.

Upon loading this program, both status display support services are initialized to Off, to avoid synchronization problems. The current assignment of the UART 84 is determined, and the appropriate option button set to true to display that assignment.

Another feature in accordance with the present invention, as described above, is control of the output power of the RF modem 82 in response to diminished battery voltage. A block diagram of a circuit to accomplish this is shown in FIG. 5.

Figure 5:
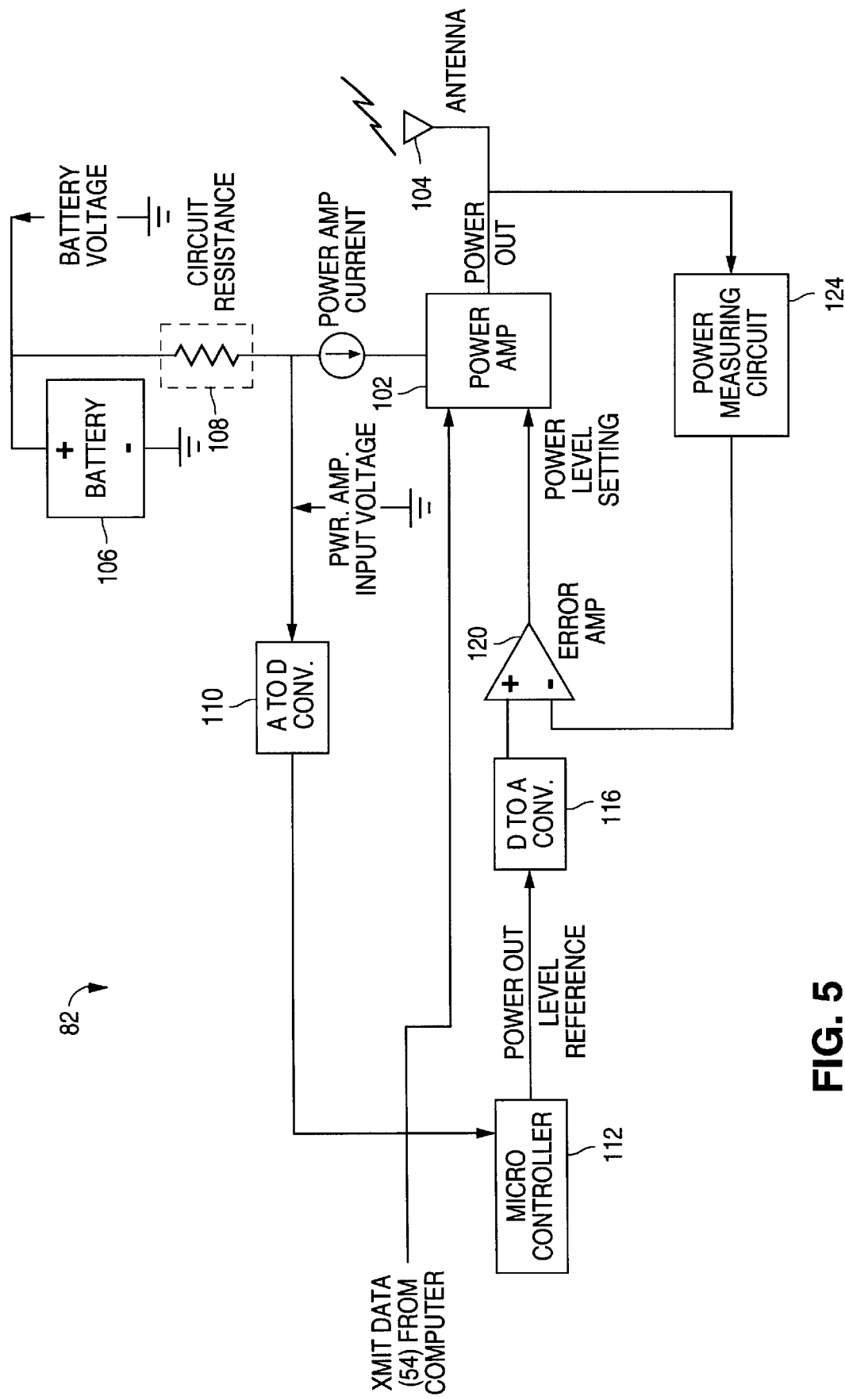
FIG. 5 shows a block diagram of a circuit for reducing radio transmitter power output in response to a battery supply voltage drop.

The circuit of FIG. 5 shows relevant portions of RF modem 82; the remaining portions are conventional. The data from super I/O chip 54 to be transmitted is coupled to power amplifier 102, which in turn has its output terminal coupled to radio antenna 104. Battery 106 (the battery of the device shown in FIG. 1) has a conventional variable output battery voltage, and is coupled through circuit resistance 108 to supply drive current to power amplifier 102, thereby providing a power amplifier input voltage which is measured and converted by analog to digital converter 110, the digital output terminal of which is connected to an input terminal of microcontroller 112 (This microcontroller is part of block 82 of FIG. 1.).

Microcontroller 112 provides a (digital) power out level reference value which is converted to an analog signal by digital to analog converter 116 to drive the positive terminal of error amplifier 120, the inverting terminal of which is connected by a feedback loop to the antenna 104 by power measuring circuit 124. Error amplifier 120 provides a power level setting to the control (gain) terminal of power amplifier 102.

It is characteristic of the power amplifier 102 used in this computing device that, as the power amplifier input voltage decreases, the power amplifier current increases, in an attempt to maintain a constant Power Out as established by the "Power Level Setting" input to the power amplifier 102. The power amplifier 102 will not operate properly below a voltage of e.g. 5.4 volts, so it is necessary to ensure that this minimum input voltage is exceeded or maintained as the battery 106 discharges during transmitter operation. Since the relationship between power amplifier current and Power Out is known and predictable, the circuit shown in FIG. 5 maintains the required minimum power amplifier input voltage by adjusting the power amplifier power level setting. This allows operation of the power amplifier 102 over the full discharge cycle of the battery 108, although at reduced output power levels.

When the power amplifier 102 is not transmitting, then the power amplifier input voltage is equal to the battery voltage. When the power amplifier 102 is transmitting, however, the power amplifier input voltage is lower than the battery voltage due to the voltage drop across the circuit resistance 108. The microcontroller 112 samples the input voltage before the power amplifier 102 begins transmitting and then adjusts the power out level reference to a value which ensures that the battery voltage minus the voltage drop across the circuit resistance 108 caused by the power amplifier current will provide not less than the minimum required e.g. 5.4 volts input voltage to the power amplifier 102.

The advantage of this approach is that compensation for variations in battery voltage is accomplished without adding additional circuitry, since the packet radio network protocol requires that the transmitter power be adjusted in any case to compensate for changes in receiver signal strength. Exemplary power level settings controlled by a conventional program resident in microcontroller 112 are shown in the following table:

| Battery Charge Lvl. | Battery Voltage | Power Output | Power Amp Input Volt | Power Amp Current |
| --- | --- | --- | --- | --- |
| Full | 7.4 Volts | 3.0 Watts | 7.0 Volts | 1.5 Amps |
| 90% | 7.25 | 3.0 | 6.8 | 1.6 |
| 75% | 7.0 | 2.9 | 6.55 | 1.7 |
| 60% | 6.75 | 2.5 | 6.1 | 1.8 |
| 45% | 6.35 | 2.1 | 5.7 | 1.9 |
| 30% | 6.0 | 1.7 | 5.4 | 1.8 |
| 15% | 5.85 | 1.4 | 5.4 | 1.4 |
| 0% | 5.7 | 1.2 | 5.4 | 1.2 |

This disclosure is illustrative and not limiting; further modifications will be apparent in light of this disclosure and are intended to fall within the scope of the appended claims. Also, it is to be understood that the various features described herein may in at least some cases be independent of one another, and it is contemplated that a computing device may include only some of these features.

We claim:

1. A method for operating a battery powered computing device which includes a radio transmitter, comprising the steps of:

measuring a voltage supplied by the battery before the radio transmitter is in operation;

comparing the measured voltage to a predetermined value; and if the measured voltage is less than the predetermined value, reducing an output power of the radio transmitter when subsequently the radio transmitter is in operation.

2. The method of claim 1, wherein the step of reducing comprises reducing the output power by a variable amount, the variable amount being larger to the extent the measured voltage is less than the predetermined value.

3. A computing device comprising:

a battery;

a main processor;

a power management circuit; and a radio transmitter, the battery being coupled to and powering the main processor, the power management circuit, and the radio transmitter; and a voltage detector coupled to the battery for measuring a voltage output of the battery;

wherein the power management circuit is coupled to the voltage detector and to the radio transmitter, and the power management circuit reduces an output power of the radio transmitter if a predicted voltage input to the radio transmitter from the battery, while the radio transmitter is operating, is less than a predetermined value.

4. The computing device of claim 3, wherein the power management circuit includes means for reducing the output power to an extent the measured voltage decreases.

* * * * *